(12) United States Patent
Sasaoka et al.

(10) Patent No.: US 6,711,331 B2
(45) Date of Patent: *Mar. 23, 2004

(54) OPTICAL FIBER

(75) Inventors: Eisuke Sasaoka, Yokohama (JP); Shigeru Tanaka, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 113 days.

This patent is subject to a terminal disclaimer.

(21) Appl. No.: 10/084,667

(22) Filed: Feb. 28, 2002

(65) Prior Publication Data

US 2002/0154875 A1 Oct. 24, 2002

Related U.S. Application Data

(63) Continuation-in-part of application No. 10/059,121, filed on Jan. 31, 2002, now abandoned, which is a continuation of application No. 09/613,755, filed on Jul. 11, 2000, now Pat. No. 6,345,140, which is a continuation-in-part of application No. PCT/JP99/03672, filed on Jul. 7, 1999.

(30) Foreign Application Priority Data

Jul. 7, 1998 (JP) ........................... P1998-191719

(51) Int. Cl.$^7$ .............................. G02B 6/02; G02B 6/22
(52) U.S. Cl. ........................... 385/123; 385/128
(58) Field of Search .................. 385/123, 126–128; 398/81

(56) References Cited

U.S. PATENT DOCUMENTS 3,980,390 A * 9/1976 Yamamoto et al. ......... 385/128

(List continued on next page.)

FOREIGN PATENT DOCUMENTS

| EP | 0 724 171 | 7/1996 |
|---|---|---|
| JP | 7-230015 | 8/1995 |
| JP | 8-248251 | 9/1996 |
| JP | 9-127354 | 5/1997 |
| JP | 9-218318 | 8/1997 |
| JP | 9-288220 | 11/1997 |
| JP | 9-318833 | 12/1997 |
| JP | 10-62640 | 3/1998 |
| JP | 10-246830 | 9/1998 |
| JP | 10-319266 | 12/1998 |
| JP | 11-72640 | 3/1999 |
| JP | 11-507445 | 6/1999 |
| WO | 98/04941 | 2/1998 |

OTHER PUBLICATIONS

GR–20–CORE "Generic Requirements for Optical Fiber and Optical Fiber Cable" Telecordia Technologies Generic Requirements, Issue 2, Jul. 1998, pp. 4–5 and 6–15.*
"Single–Mode Fibers: Fundamentals", by E.G. Neumann, 1998, p. 225.
Proceedings of 47th International Wire and Cable Symposium, Nov. 16–19, 1998, The New 160 Gigabit WDM Challenge for Submarine Cable Systems, Libert et al.

*Primary Examiner*—Edward J. Glick
*Assistant Examiner*—Krystyna Suchecki
(74) *Attorney, Agent, or Firm*—McDermott, Will & Emery

(57) ABSTRACT

The present invention relates to an optical fiber having, at least, a structure for effectively restraining microbend loss from increasing. This optical fiber is an optical fiber suitable for a dispersion-flattened fiber, a dispersion-compensating fiber, and the like, and insured its single mode in a wavelength band in use. In particular, since the fiber diameter is 140 μm or more, this optical fiber has a high rigidity, so that the increase in microbend loss is effectively suppressed, whereas the probability of the optical fiber breaking due to bending stresses is practically unproblematic since the fiber diameter is 200 μm or less. Also, since this optical fiber has a larger mode field diameter, it lowers the optical energy density per unit cross-sectional area, thereby effectively restraining nonlinear optical phenomena from occurring.

16 Claims, 11 Drawing Sheets

U.S. PATENT DOCUMENTS

| | | | |
|---|---|---|---|
| 4,852,968 A | * 8/1989 | Reed | 385/127 |
| 5,740,297 A | 4/1998 | Onishi et al. | 385/127 |
| 5,852,701 A | 12/1998 | Kato et al. | 385/123 |
| 5,854,871 A | 12/1998 | Akasaka | 385/123 |
| 5,878,182 A | 3/1999 | Peckham | 385/123 |
| 5,887,104 A | * 3/1999 | Sugizaki et al. | 385/123 |
| 5,995,695 A | 11/1999 | Aikawa et al. | 385/123 |
| 5,999,679 A | 12/1999 | Antos et al. | 385/127 |
| 6,031,956 A | 2/2000 | Li et al. | 385/127 |
| 6,345,140 B1 | * 2/2002 | Sasaoka et al. | 385/123 |

* cited by examiner

|  | SAMPLE 1 a | SAMPLE 1 b | SAMPLE 1 c | SAMPLE 1 d |
|---|---|---|---|---|
| FIBER DIAMETER ($\mu$m) | 125.1 | 139.8 | 150.4 | 160.2 |
| MFD ($\mu$m) | 11.73 | 11.84 | 11.87 | 11.88 |
| EFFECTIVE AREA ($\mu$m$^2$) | 69.7 | 71.4 | 72.1 | 72.1 |
| CHROMATIC DISPERSION (ps/nm/km) | -2.1 | -2.2 | -2.0 | -1.9 |
| CUTOFF WAVELENGTH ($\mu$m) | 1.53 | 1.51 | 1.50 | 1.52 |

Fig.8

|  | SAMPLE 2 a | SAMPLE 2 b | SAMPLE 2 c |
|---|---|---|---|
| FIBER DIAMETER ($\mu$m) | 124.9 | 125.2 | 139.6 |
| MFD ($\mu$m) | 9.98 | 10.96 | 11.06 |
| EFFECTIVE AREA ($\mu m^2$) | 54.8 | 64.8 | 65.1 |
| CHROMATIC DISPERSION (ps/nm/km) | -2.1 | -2.0 | -2.2 |
| CUTOFF WAVELENGTH ($\mu$m) | 1.53 | 1.53 | 1.51 |

Fig.9

|  | SAMPLE 3 a | SAMPLE 3 b | SAMPLE 3 c | SAMPLE 3 d |
|---|---|---|---|---|
| FIBER DIAMETER ($\mu$m) | 150.1 | 171.8 | 150.2 | 169.3 |
| MFD ($\mu$m) | 13.21 | 13.18 | 14.20 | 14.21 |
| EFFECTIVE AREA ($\mu m^2$) | 79.7 | 80.4 | 90.1 | 90.4 |
| CHROMATIC DISPERSION (ps/nm/km) | -2.1 | -2.2 | -2.0 | -2.2 |
| CUTOFF WAVELENGTH ($\mu$m) | 1.53 | 1.51 | 1.50 | 1.51 |

Fig.12

| | SAMPLE 4 a | SAMPLE 4 b |
|---|---|---|
| FIBER DIAMETER ($\mu$m) | 125.1 | 150.4 |
| MFD ($\mu$m) | 11.98 | 12.17 |
| EFFECTIVE AREA ($\mu m^2$) | 69.7 | 72.1 |
| CHROMATIC DISPERSION (ps/nm/km) | -2.1 | -2.2 |
| CUTOFF WAVELENGTH ($\mu$m) | 1.53 | 1.51 |

OPTICAL FIBER

RELATED APPLICATIONS

This is a Continuation-In-Part application of U.S. patent application Ser. No. 10/059,121 filed on Jan. 31, 2002 now abandoned, which is a continuation application of the U.S. patent application Ser. No. 09/613,755 filed on Jul. 11, 2000 now U.S. Pat. No. 6,345,140, which is a continunation-in-part of PCT/JP99/03672 filed Jul. 7, 1999.

BACKGROUND OF THE INVENTION

1. Field of the Invention

The present invention relates to an optical fiber which is suitable as an optical transmission line in wavelength division multiplexing (WDM) transmission systems.

2. Related Background Art

WDM transmission lines which enable optical transmissions, those of a large capacity and high speed in particular, mainly utilize optical fibers. Recently, however, the deterioration in light signals caused by nonlinear optical phenomena such as four-wave mixing among individual light signals occurring in an optical fiber has become problematic in such WDM transmission systems. Therefore, in the WDM transmission systems, it is important that the occurrence of nonlinear optical phenomena be suppressed, and to this aim, it is necessary that the mode field diameter or effective area of the optical fiber be increased, so as to lower the optical energy density per unit cross-sectional area. For example, Japanese Patent Application Laid-Open No. HEI 8-248251 discloses an optical fiber having an effective area (70 $\mu m^2$ or more) which is greater than that of normal dispersion-shifted fibers.

SUMMARY OF THE INVENTION

It has been known that, in general, microbend characteristics deteriorate as the mode field diameter or the effective area increases, whereby the microbend loss caused by cabling becomes greater.

For example, FIG. 1 is a chart showing the refractive index profile of a dispersion-shifted fiber having a double core structure. In this dispersion-shifted fiber, the core region is constituted by an inner core having a refractive index n1 and an outer core having a refractive index n2 (<n1), whereas a single cladding layer having a refractive index n3 (<n2) is provided on the outer periphery of the core region. On the other hand, FIG. 2 is a graph showing the relationship between the mode field diameter and the increase in loss caused by microbend at a wavelength of 1.55 $\mu m$ (1550 nm) concerning this optical fiber having the refractive index profile of a double core structure. In this specification, the mode field diameter refers to Petermann-I mode field diameter. This Petermann-I mode field diameter is given by the following expressions (1a) and (1b):

$$MFD1 = 2 \cdot w_1 \quad (1a)$$

$$w_1^2 = 2 \cdot \frac{\int_0^\infty E^2 \cdot r^3 \, dr}{\int_0^\infty E \cdot r \, dr} \quad (1b)$$

as shown in E. G. Neumann, "Single-Mode Fibers," pp. 225, 1988.

In expression (1b), r is the radial positional variable from the core center taken as the origin, whereas E is the electric field amplitude and is a function of the positional variable r.

The microbend loss is defined by the amount of increase in loss when an optical fiber having a length of 250 m is wound at a tension of 100 g around a bobbin having a barrel diameter of 280 mm whose surface is wrapped with a JIS #1000 sandpaper sheet.

Also, from the results of theoretical studies, it has been known that the relationships of the following expressions (2a) to (2c) exist between microbend loss $\Delta\alpha$ and mode field diameter MFD1:

$$\Delta\alpha = \frac{1}{4} \cdot \left(\frac{1}{R^2}\right) \cdot (k \cdot n1 \cdot w_1)^2 \cdot \Phi(\Delta\beta) \quad (2a)$$

$$\Delta\beta = \frac{1}{w_1^2 \cdot k \cdot n_1} \quad (2b)$$

$$\Phi(\Delta\beta) = \pi^{1/2} \cdot Lc \cdot \exp\left[-\left(\frac{\Delta\beta \cdot Lc}{2}\right)^2\right] \quad (2c)$$

In these expressions, R is the radius of curvature of microbending applied to the optical fiber, k is the wave number, n1 is the refractive index of the core region, and Lc is the correlation length of the microbending applied to the optical fiber.

As can be seen from FIG. 2 and expressions (2a) to (2c) mentioned above, the microbend loss increases as the mode field diameter MFD1 is greater. However, though the conventional optical fibers are designed in view of macrobend loss, no consideration has been given to microbend loss. Also, it has been known that, if the amount of increase in loss measured when an optical fiber is wound around a bobbin whose surface is wrapped with sandpaper, as an index for cabling an optical fiber, exceeds about 1 dB/km, then microbend loss increases upon cabling. Hence, it is clear that microbend loss increases upon cabling in an optical fiber such as the one mentioned above.

In order to overcome such problems, it is an object of the present invention to provide an optical fiber having, at least, a structure which can effectively suppress the increase in microbend loss.

For achieving the above-mentioned object, the optical fiber according to the present invention comprises a core region extending along a predetermined axis and a cladding region provided on the outer periphery of the core region, these core and cladding regions being constituted by at least three layers of glass regions having respective refractive indices different from each other. Also, this optical fiber is substantially insured its single mode with respect to light at a wavelength in use, e.g., in a 1.55-$\mu m$ wavelength band (1500 nm to 1600 nm), and has a fiber diameter of 140 $\mu m$ or more but 200 $\mu m$ or less. Thus, since the fiber diameter is 140 $\mu m$ or more, the rigidity of the optical fiber according to the present invention is high even when the mode field diameter is large, whereby the increase in microbend loss is suppressed. On the other hand, since the fiber diameter is not greater than 200 $\mu m$, the probability of the optical fiber breaking due to bending stresses is practically unproblematic.

In particular, when the 1.55-$\mu m$ wavelength band is employed as the wavelength band in use for WDM transmissions, it is preferred in the optical fiber according to the present invention that the absolute value of chromatic dispersion at a wavelength of 1550 nm be 5 ps/nm/km or less. Also, it is preferred that the Petermann-I mode field diameter be 11 $\mu m$ or more. It is because of the fact that, if the mode field diameter is 11 $\mu m$ or more, then the optical energy density per unit cross-sectional becomes smaller even when WDM signals are transmitted, whereby the occurrence of nonlinear optical phenomena can effectively be suppressed.

The optical fiber according to the present invention can be employed as a single-mode optical fiber such as dispersion-shifted fiber, dispersion-flattened fiber, dispersion-compensating fiber, or the like.

In particular, when the optical fiber according to the present invention is employed as a dispersion-flattened fiber, it is preferable for the optical fiber to have, for at least one wavelength within the wavelength band in use, a dispersion slope of 0.02 ps/nm²/km or less and an effective area of 50 $\mu m^2$ or more. More preferably, in particular, the dispersion slope is 0.02 ps/nm²/km or less in terms of absolute value.

Also, when the optical fiber according to the present invention is employed as a dispersion-compensating fiber, it is preferable for the optical fiber to have, for at least one wavelength within the wavelength band in use, a chromatic dispersion of −18 ps/nm/km or less and an effective area of 17 $\mu m^2$ or more.

Further, when the optical fiber according to the present invention is employed as an optical fiber having an enlarged effective area, it is preferable for the optical fiber to have, for at least one wavelength within the wavelength band in use, an effective area of 110 $\mu m^2$ or more. The optical energy density per unit cross-sectional area can be kept low in this optical fiber as well, whereby the occurrence of nonlinear optical phenomena can be suppressed effectively.

In various kinds of optical fibers mentioned above, the fiber diameter is 150 $\mu m$ or more but 200 $\mu m$ or less. In the case of a dispersion-compensating fiber having such characteristics as those mentioned above, however, its fiber diameter is preferably 140 $\mu m$ or more but 200 $\mu m$ or less since its microbend characteristics are likely to deteriorate in particular.

When the optical fiber according to the present invention is employed in an optical cable, it is preferable for the optical fiber to have, for at least one wavelength within the wavelength band in use, an effective area of 17 $\mu m^2$ or more and a chromatic dispersion value of −83 ps/nm/km or more, and have a fiber diameter of 140 $\mu m$ or more but 200 $\mu m$ or less. Such an optical fiber aimed at cabling can be employed as a single-mode optical fiber such as dispersion-shifted fiber, dispersion-flattened fiber, dispersion-compensating fiber, or the like as well.

As explained in the foregoing, in view of various circumstances applicable thereto, the optical fiber according to the present invention is preferably an optical fiber which has a fiber diameter of 140 $\mu m$ or more but 200 $\mu m$ or less, and also has, for at least one wavelength within the wavelength band in use, an effective area of 17 $\mu m^2$ or more and a chromatic dispersion value of −83 ps/nm/km or more; and, further, preferably is an optical fiber which has a fiber diameter of 140 $\mu m$ or more but 200 $\mu m$ or less, and also has, for at least one wavelength within the wavelength band in use, an effective area of 17 $\mu m^2$ or more and a chromatic dispersion value of −48 ps/nm/km or more. Also, depending on the kind of optical fiber employed, the fiber diameter thereof is preferably 150 $\mu m$ or more but 200 $\mu m$ or less.

The optical fiber according to the present invention may comprise a coating layer provided on the outer periphery of the cladding region. The coating layer preferably has a diameter of 260 $\mu m$ or less, and, for example, has a thickness of 55 $\mu m$ or less but 25 $\mu m$ or more. The coating layer also has a single-layer structure or two-layer lamination structure. The coating layer of the single-layer type preferably has Young's modulus of 1 to 200 kgf/mm². On the other hand, the coating layer of two-layer type comprises a first layer provided on the outer periphery of the cladding region and a second layer provided on the outer periphery of the first layer. The second layer preferably has Young's modulus of 1000 times greater than that of the first layer. Specifically, it is preferable that the first layer has Young's modulus of 0.01 to 0.2 kgf/mm² and the second layer has Young's modulus of 10 to 200 kgf/mm² at a temperature of 20° C.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3A is a view showing a cross-sectional structure which is common in individual embodiments of the optical fiber according to the present invention, whereas

FIG. 7A is a view showing a cross-sectional structure of an optical fiber unit constituting a part of an optical cable, whereas

FIG. 8 is a table listing characteristics of three samples prepared as prototypes for explaining the second embodiment of the optical fiber according to the present invention;

FIG. 9 is a table listing characteristics of four samples prepared as prototypes for explaining the third embodiment of the optical fiber according to the present invention;

FIG. 12 is a table listing characteristics of two samples prepared as prototypes for explaining the fourth embodiment of the optical fiber according to the present invention;

DETAILED DESCRIPTION OF THE PREFERRED EMBODIMENTS

Individual embodiments of the optical fiber according to the present invention will now be explained in detail with reference to FIGS. 1, 3A to 4B, 5, 6, 7A, 7B, and 8 to 15.

Figure 3A:
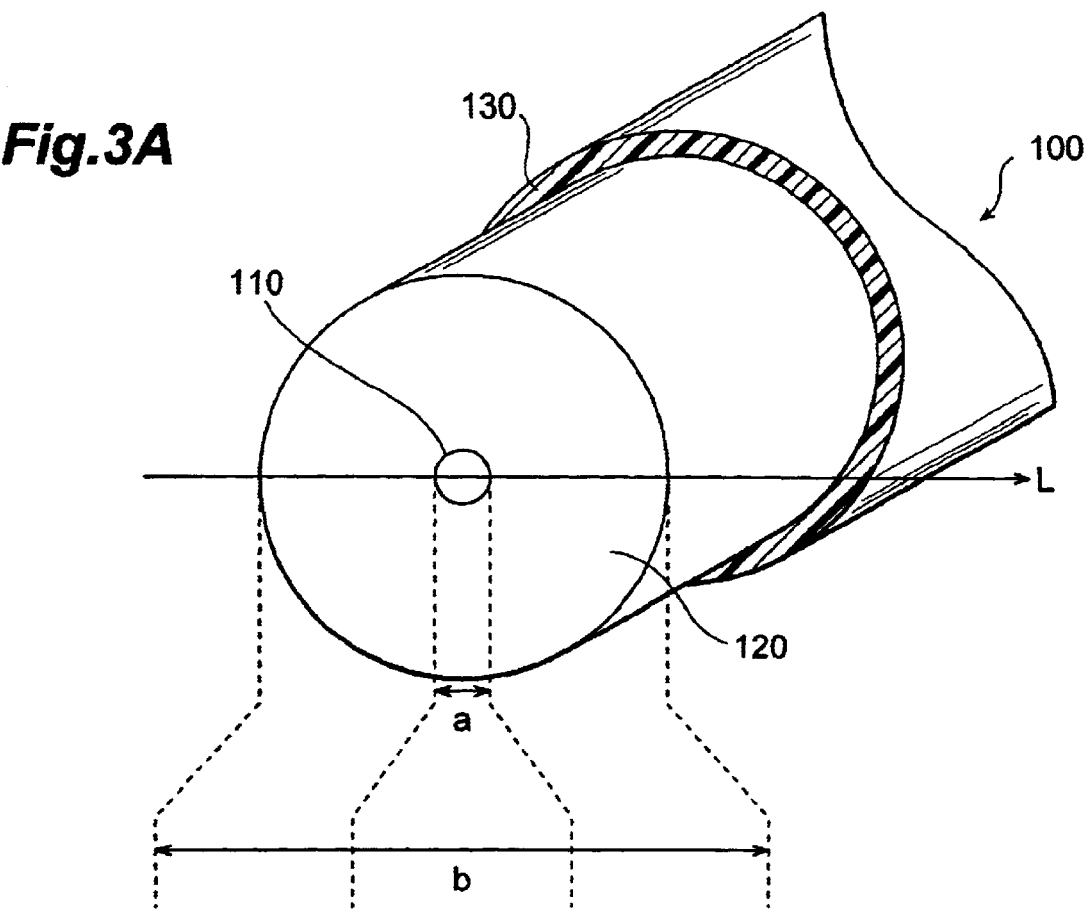

Here, as shown in FIG. 3A, the optical fiber 100 according to the present invention comprises a core region 110 extending along a predetermined axis and having an outside diameter a, a cladding region 120 provided on the outer periphery of the core region 110 and having an outside diameter b (coinciding with the fiber diameter), and a coating layer 130 provided on the outer periphery of the cladding region 120, whereas the core and cladding regions are constituted by at least three layers of glass regions having respective refractive indices different from each other in embodiments which will be explained in the following. Also, in each of the optical fibers according to the respective embodiments, the absolute value of chromatic dispersion at a wavelength of 1.55 μm (1550 nm) is 5 ps/nm/km or less, the Petermann-I mode field diameter is 11 μm or more, and the fiber diameter b is 140 μm or more but 200 μm or less.

Figure 1:
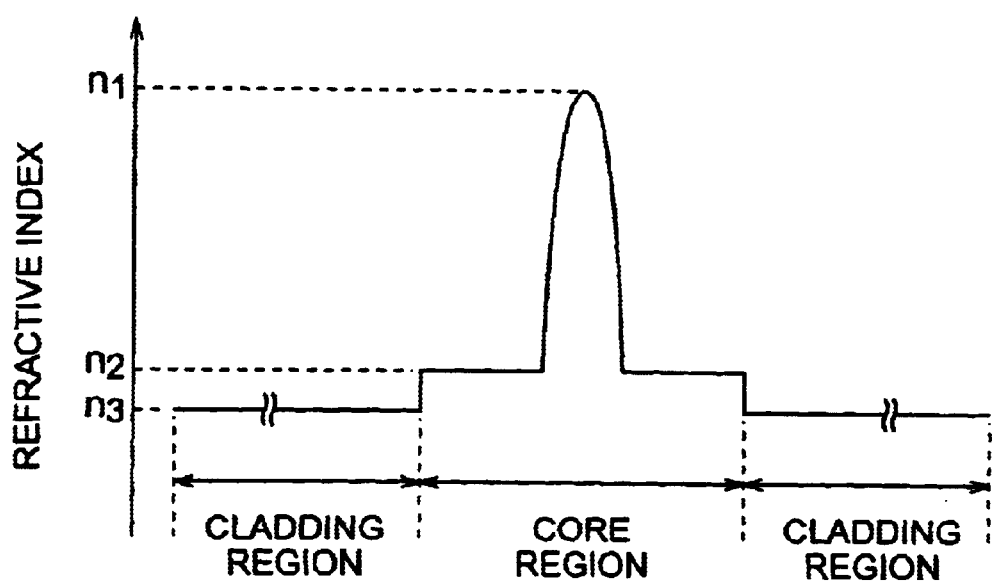
FIG. 1 is a chart showing the refractive index profile (double core structure) of a dispersion-shifted fiber.
Figure 2:
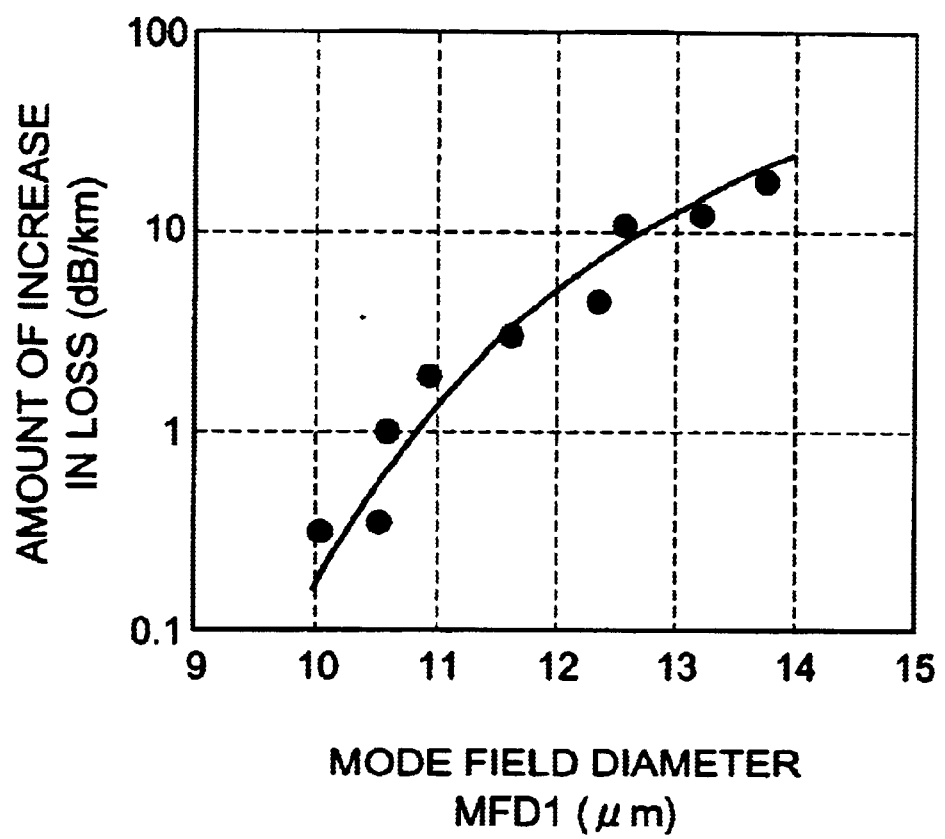
FIG. 2 is a graph showing the relationship between the mode field diameter (Petermann-I) and the increase in loss caused by microbend at a wavelength of 1.55 $\mu m$ in the dispersion-shifted fiber shown in FIG. 1.
Figure 3B:
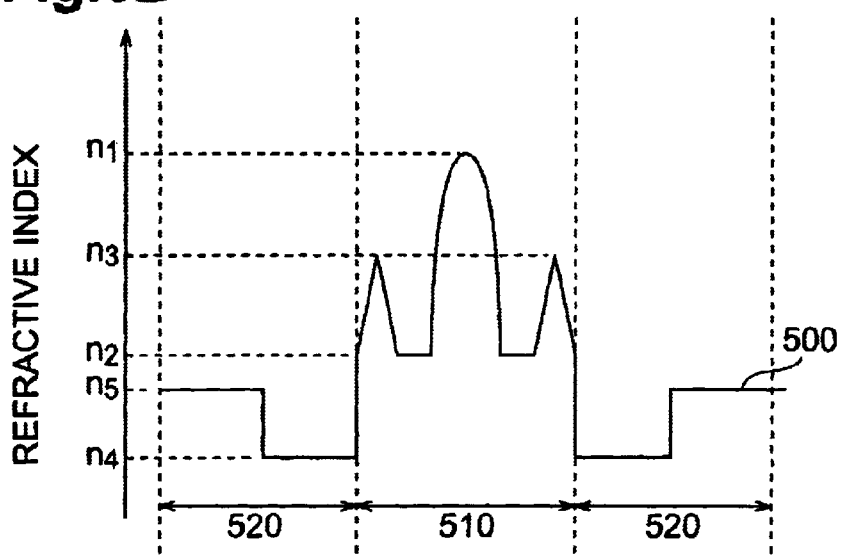
FIG. 3B is a chart showing the refractive index profile of the optical fiber according to the fourth embodiment.

The optical fibers according to the first to third embodiments have a refractive index profile of double core structure identical to that shown in FIG. 1, whereas the optical fiber according to the fourth embodiment has a refractive index profile with an outer ring core/depressed cladding structure as shown in FIG. 3B.

The refractive index profile shown in FIG. 1 indicates the refractive index in each part on the line L in FIG. 3A. In the optical fibers of the first to third embodiments, the core region 110 having the outside diameter a is constituted by an inner core having a refractive index n1, and an outside core provided on the outer periphery of the inner core and having a refractive index n2 (<n1), whereas the cladding region 120 having the outside diameter b (coinciding with the fiber diameter) is constituted by a single cladding provided on the outer periphery of the outer core and having a refractive index n3 (<n2). Thus, each of the optical fibers according to the first to third embodiments is an optical fiber which is constituted by three glass layers (the inner core, outer core, and single cladding) and is insured its single mode in a wavelength band in use.

On the other hand, the optical fiber according to the fourth embodiment is an optical fiber having a refractive index profile 500 with an outer ring core/depressed cladding structure as shown in FIG. 3B, whereas the refractive index profile 500 also indicates the refractive index in each part on the line L in FIG. 3A. In particular, in the refractive index profile 500, parts 510 and 520 indicate a core region having an outside diameter a and a cladding region having an outside diameter b, respectively. In the fourth embodiment, the core region is constituted by an inner core having a refractive index n1, an intermediate core provided on the outer periphery of the inner core and having a refractive index n2 (<n1), and an outer ring core provided on the outer periphery of the intermediate core and having a refractive index n3 (>n2). On the other hand, the cladding region is constituted by an inner cladding provided on the outer periphery of the outer core and having a refractive index n4 (<n3), and an outer cladding provided on the outer periphery of the inner cladding and having a refractive index n5 (>n4). Thus, the optical fiber according to the fourth embodiment is an optical fiber which is constituted by five layers of glass (the inner core, intermediate core, outer ring core, inner cladding, and outer cladding) and is insured its single mode in a wavelength band in use.

Figure 4A:
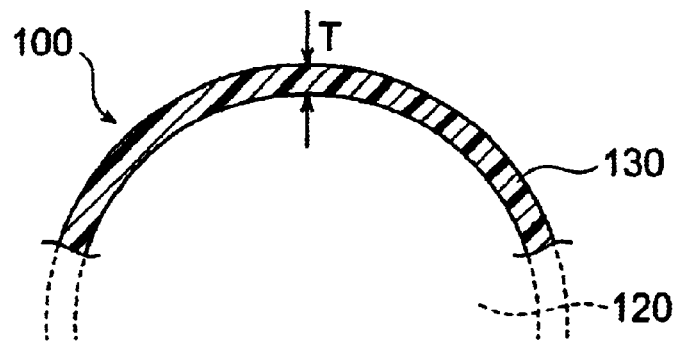
FIGS. 4A and 4B are views showing cross-sectional structures of two types of the coating layers shown in FIG. 3A.
Figure 4B:
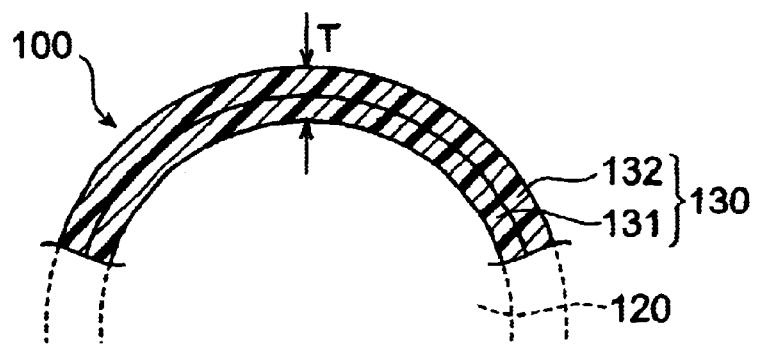

The coating layer 130, shown in FIG. 3A, can has a single-layer structure or two-layer lamination structure. FIG. 4A is a view showing a cross-sectional structure of the coating layer 130 with a single-layer structure. In FIG. 4A, the coating layer 130 preferably has a diameter of 260 μm or less, and, for example, has a thickness T of 55 μm or less but 25 μm or more. The coating layer 130 of the single-layer type preferably has Young's modulus of 1 to 200 kgf/mm². On the other hand, FIG. 4B is a view showing a cross-sectional structure of the coating layer 130 with a two-layer lamination structure. In FIG. 4B, the coating layer 130 comprises a first layer 131 provided on the outer periphery of the cladding region 120, and a second layer 132 provided on the outer periphery of the first layer 131. The coating layer 130 of two-layer lamination type preferably has a diameter of 260 μm or less, and, for example, has a thickness T of 55 μm or less but 25 μm or more. In the coating layer 130 of two-layer lamination type, the second layer 132 preferably has Young's modulus of 1000 times greater than that of the first layer 131. Specifically, it is preferable that the first layer 131 has Young's modulus of 0.01 to 0.2 kgf/mm² and the second layer 132 has Young's modulus of 10 to 200 kgf/mm² at a temperature of 20° C.

The optical fibers according to the first to seventh embodiments having the refractive index profiles mentioned above will now be explained successively.

First Embodiment

Figures 5, 6:
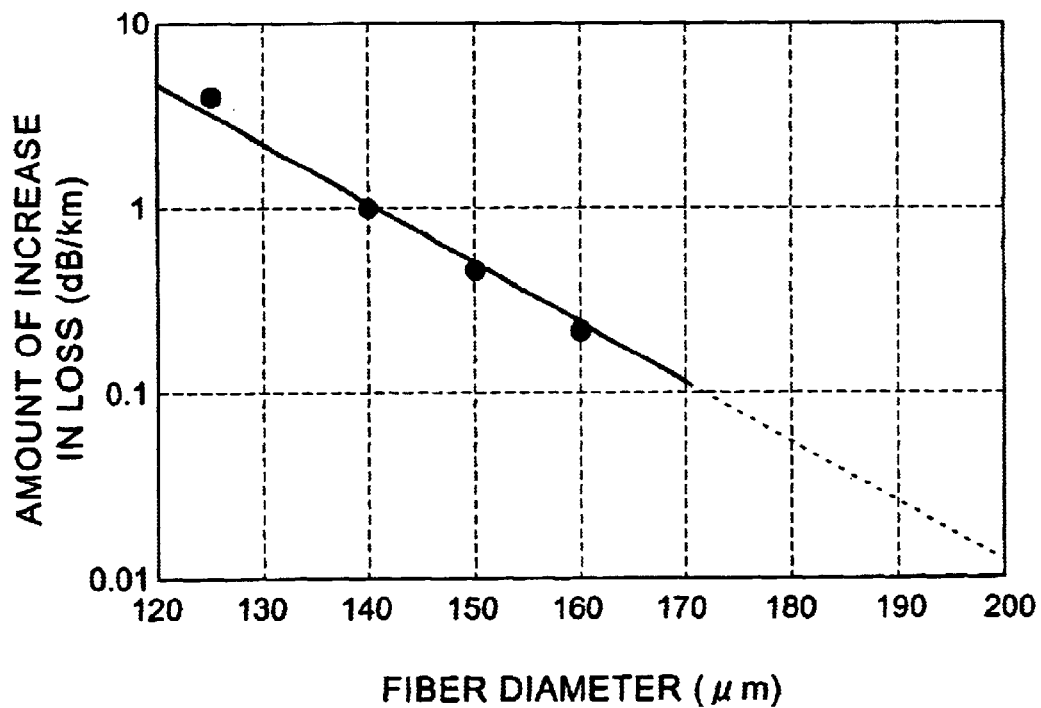
FIG. 5 is a table listing characteristics of four samples prepared as prototypes for explaining the optical fiber according to the first embodiment.
FIG. 6 is a graph showing respective results of evaluation of the four samples prepared as prototypes for explaining the optical fiber according to the first embodiment.

First, for explaining the optical fiber according to the first embodiment, four kinds of optical fibers (sample 1a to sample 1d) having substantially the same Petermann-I mode field diameter MFD1 and respective values of fiber diameter b different from each other were prepared as prototypes and evaluated. FIG. 5 is a table listing characteristics of each of the four kinds of samples 1a to 1d prepared as prototypes for explaining the optical fiber according to the first embodiment.

The fiber diameter b is about 125 μm in sample 1a, about 140 μm in sample 1b, about 150 μm in sample 1c, and about 160 μm in sample 1d. Here, each of the Petermann-I mode field diameter MFD1 (11.73 to 11.88 μm) given by the above-mentioned expressions (1a) and (1b), effective area (69.7 to 72.1 μm²), chromatic dispersion value (−2.2 to −1.9 ps/nm/km), and cutoff wavelength (1.50 to 1.53 μm) is substantially the same among the four kinds of samples 1a to 1d.

Such four kinds of samples 1a to 1d having respective values of fiber diameter b different from each other are obtained by preparing four kinds of preforms, which use core members having an identical diameter, whose outside diameter ratios between core member and cladding member differ from each other, and drawing them. Further, the periphery of each of the four kinds of samples 1a to 1d is provided with the coating layer, made of the same material, having an outside diameter of 250 μm (see FIG. 4A). The values of the mode field diameter MFD1, effective area, and chromatic dispersion are those measured at a wavelength of 1.55 μm (1550 nm)

For each of these four kinds of samples 1a to 1d, microbend loss was measured. In this measurement, each optical fiber having a length of 250 m was wound at a tension of 100 g around a bobbin having a barrel diameter of 280 mm whose surface was wrapped with a JIS #1000 sandpaper sheet, and the resulting amount of increase in loss was defined as the microbend loss. FIG. 6 is a graph showing the respective results of evaluation of the four kinds of samples prepared as prototypes for explaining the optical fiber according to the first embodiment. It is seen from this graph that the amount of increase in loss, i.e., microbend loss, becomes smaller as the fiber diameter b is greater.

Figure 7A:
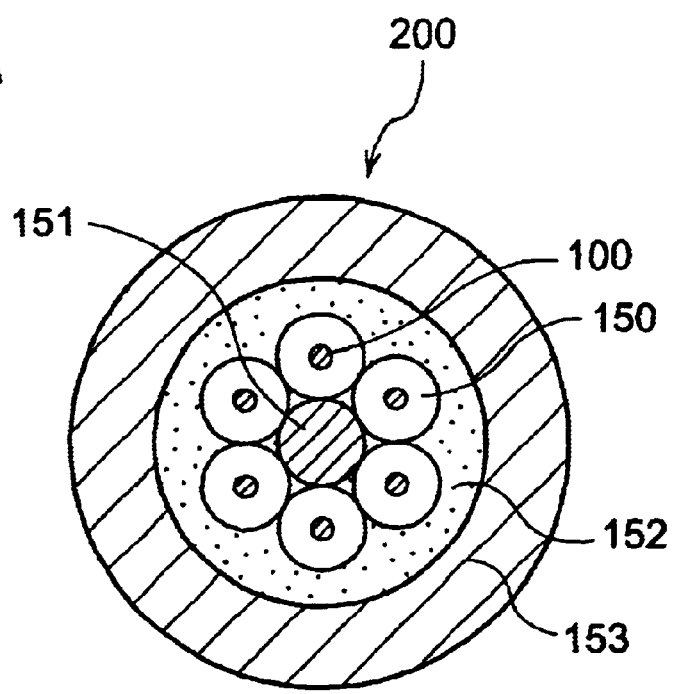
Figure 7B:
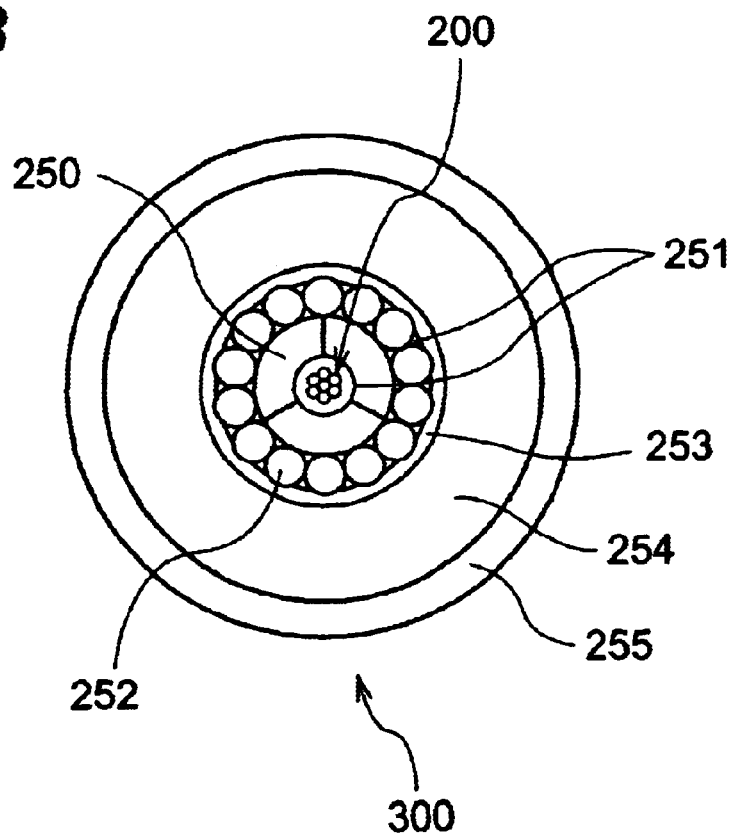
FIG. 7B is a view showing a cross-sectional structure of the optical cable having the optical fiber unit shown in FIG. 7A.

When an optical cable having a cross-sectional structure such as those shown in FIGS. 7A and 7B is being made, the microbend loss increases upon cabling. For preventing this phenomenon from occurring, it is necessary that the microbend loss be suppressed to about 1 dB/km or less. Therefore, as can be seen from FIG. 6, it is necessary for the fiber diameter b to become 140 $\mu$m or more when the effective area is about 70 $\mu m^2$.

Here, FIG. 7A is a view showing the cross-sectional structure of an optical fiber unit, whereas FIG. 7B is a view showing the cross-sectional structure of an optical cable in which this optical fiber unit 200 is employed. In FIG. 7A, optical fibers 100 each having a UV-curable resin 150 coated thereon as the coating layer 130 are integrated with each other about a tension member 151 with a UV-curable resin 152. Further, the periphery of the UV-curable resin 152 is coated with a UV-curable resin 153, so that the optical fiber unit 200 is obtained. An optical cable 300 employing the optical fiber unit 200 is obtained by accommodating into a copper tube 253 the optical fiber unit 200 successively covered with a three-part pipe 250 made of a steel and tension piano wires 252 by way of a water-running prevention compound 251, and then successively covering the outer periphery of the copper tube 253 with a low-density polyethylene 254 and a high-density polyethylene 255.

Second Embodiment

Next, in the second embodiment, the comparison between characteristics of a conventional optical fiber which has already been verified to be free from the problem caused by cabling and characteristics of the optical fiber according to the second embodiment will be explained. FIG. 8 is a table listing characteristics of each of three kinds of samples 2a to 2c prepared as prototypes for explaining the optical fiber according to the second embodiment. Among them, sample 2a is a conventional optical fiber which has already been verified to be free from the problem caused by cabling.

The fiber diameter b is about 125 $\mu$m in samples 2a and 2b, and about 140 $\mu$m in sample 2c. The Petermann-I mode field diameter MFD1 given by the above-mentioned expressions (1a) and (1b) is about 10 $\mu$m in sample 2a, and about 11 $\mu$m in samples 2b and 2c. The effective area is about 55 $\mu m^2$ in sample 2a, and about 65 $\mu m^2$ in samples 2b and 2c. Here, each of the chromatic dispersion value (−2.2 to −2.0 ps/nm/km) and cutoff wavelength (1.51 to 1.53 $\mu$m) is substantially the same value among the three kinds of samples 2a to 2c. The periphery of each of the three samples 2a to 2c is provided with the coating layer, made of the same material, having an outside diameter of 250 $\mu$m (see FIG. 4A). The values of the mode field diameter MFD1, effective area, and chromatic dispersion are those measured at a wavelength of 1.55 $\mu$m.

Using these three kinds of samples 2a to 2c, the optical fiber unit 200 having the cross-sectional structure shown in FIGS. 7A and 7B was made. A hydraulic pressure of 100 atmospheres was applied to thus obtained optical fiber unit 200, so as to simulate the external pressure applied to the optical fiber unit 200 upon cabling. As a result, the amount of increase in loss, i.e., microbend loss, in sample 2b having a fiber diameter b of about 125 $\mu$m and an effective area of about 65 $\mu m^2$ was 20 mdB/km. On the other hand, the amount of increase in loss, i.e., microbend loss, in sample 2c having a fiber diameter b of about 140 $\mu$m and an effective area of about 65 $\mu m^2$ was not greater than 0.5 mdB/km, which was the limit of measurement, whereby this sample yielded a characteristic equivalent to that of the conventional sample 2a which had already been verified to be free from the problem caused by cabling.

Third Embodiment

The third embodiment will now be explained. In the third embodiment, for optical fibers having a further greater effective area, the effect of reducing microbend loss resulting from the increase in fiber diameter was verified. FIG. 9 is a table listing characteristics of each of four kinds of samples 3a to 3d prepared as prototypes for explaining the optical fiber according to the third embodiment.

The fiber diameter b is about 150 $\mu$m in samples 3a and 3c, and about 170 $\mu$m in samples 3b and 3d. The Petermann-I mode field diameter MFD1 given by the above-mentioned expressions (1a) and (1b) is about 13.2 $\mu$m in samples 3a and 3b, and about 14.2 $\mu$m in samples 3c and 3d. The effective area is about 80 $\mu m^2$ in samples 3a and 3b, and about 90 $\mu m^2$ in samples 3c and 3d. On the other hand, each of the chromatic dispersion value (−2.0 to −2.2 ps/nm/km) and cutoff wavelength (1.50 to 1.53 $\mu$m) is substantially the same value among the four kinds of samples 3a to 3d. The periphery of each of the four samples 3a to 3d is provided with the coating layer, made of the same material, having an outside diameter of 250 $\mu$m (see FIG. 4A). The values of the mode field diameter MFD1, effective area, and chromatic dispersion are those measured at a wavelength of 1.55 $\mu$m.

Figure 10:
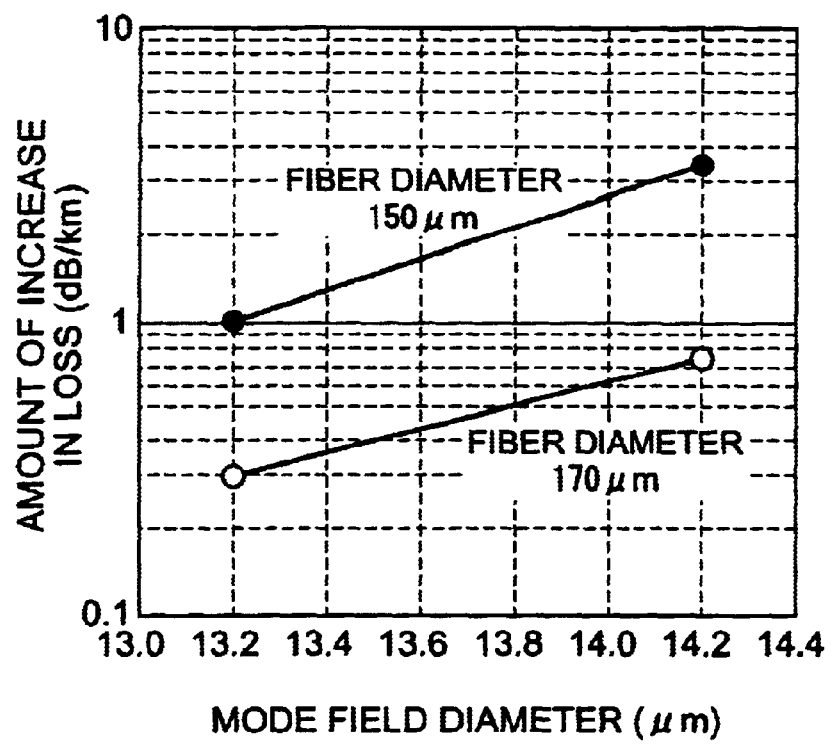
FIG. 10 is a graph showing respective results of evaluation of the four samples prepared as prototypes for explaining the optical fiber according to the third embodiment.

For each of these four kinds of samples 3a to 3d, microbend loss was measured. The method of measuring the microbend loss was similar to that in the case of the first embodiment. FIG. 10 is a graph showing respective results of evaluation of the four kinds of samples prepared as prototypes for explaining the optical fiber according to the third embodiment. As can be seen from this graph, when the effective area is about 80 $\mu m^2$, the microbend loss can be suppressed to its target value of about 1 dB/km or less if the fiber diameter b is about 150 $\mu$m or more. On the other hand, when the effective area is about 90 $\mu m^2$, the microbend loss can be suppressed to its target value of 1 dB/km or less if the fiber diameter b is about 170 $\mu$m or more.

From the foregoing, it is seen that, even when the effective area is large, the microbend loss can be suppressed to its target value of about 1 dB/km or less if the fiber diameter is large. This fact can be explained by the following as well. Namely, the microbend loss of an optical fiber is generated when an external force applied to the optical fiber causes random minute curvatures in the longitudinal direction in the core region of the optical fiber. This microbend loss is proportional to the square mean of the reciprocals of the radii of curvature of the minute curvatures. On the other hand, if the external force applied to the optical fiber is constant, then the minute curvatures occurring in the optical fiber can be suppressed by increasing the rigidity of the optical fiber. Letting b be the fiber diameter of the optical fiber, the rigidity (bending moment) I of the optical fiber is given by the following expression (3):

$$I = \pi \cdot b^4 / 64 \tag{3}$$

Therefore, increasing the fiber diameter b of the optical fiber greatly improves the rigidity I of the optical fiber, thereby suppressing minute curvatures and greatly reducing the microbend loss.

For example, when an optical fiber having a fiber diameter of 200.3 $\mu$m, an effective area of 90.4 $\mu m^2$, a chromatic dispersion value of −2.1 ps/nm/km, a cutoff wavelength of 1.73 μm, and a coating layer with an outside diameter of 250 μm was prepared as a prototype, and its microbend loss was measured in a manner similar to that of the first embodiment, the resulting value was 0.3 dB/km. This characteristic is on a par with that of the conventional optical fiber which has already been verified to be free from the problem caused by cabling.

As the fiber diameter b increases, however, the stress in the fiber surface (the surface of the outermost cladding layer) occurring when the optical fiber is bent becomes greater than that in the conventional optical fiber, thereby increasing the probability of breaking upon bending. Hence, the range of fiber diameter b within which the probability of breaking is practically unproblematic will now be calculated by way of trial. The probability of breaking F of the optical fiber after passing a screening test is given by the following expression (4):

$$F = 1 - \exp\left(-L \cdot Np \cdot \left\{\left[1 + \left(\frac{\sigma_s}{\sigma_p}\right)^n \cdot \frac{ts}{tp}\right]^{m/(n+1)} - 1\right\}\right) \quad (4)$$

where L is the optical fiber length to which a stress is applied in the state of its actual use, Np is the number of breaks per unit length at the time of screening test, σs is the stress upon its actual use, σp is the stress at the time of screening, ts is the time of actual use, tp is the screening time, n is the fatigue coefficient, and m is a parameter representing the gradient of a Weibull plot.

It is assumed that smaller-diameter bending in an optical fiber at the time of actual use occurs in a surplus length portion which is left for fusion connection in a repeater, and that one turn of bending with a diameter of 30 mm exists in one repeater at worst. Also, it is assumed that the total optical fiber length of the optical transmission system is 9000 km, in which repeaters are disposed at intervals of 50 km on average. Then, the fiber length L to which the bending with a diameter of 30 mm is applied becomes 16.9 m in the optical transmission system as a whole. It is also assumed that the number of breaks per unit length at the time of screening test Np is $2 \times 10^{-5}$, and the stress σp at the time of screening is 2.2%. Let the time of actual use ts be 25 years, and the screening time tp be 1 second. Let the fatigue coefficient n be 20, and the parameter m representing the gradient of the Weibull plot be 10.

Figure 11:
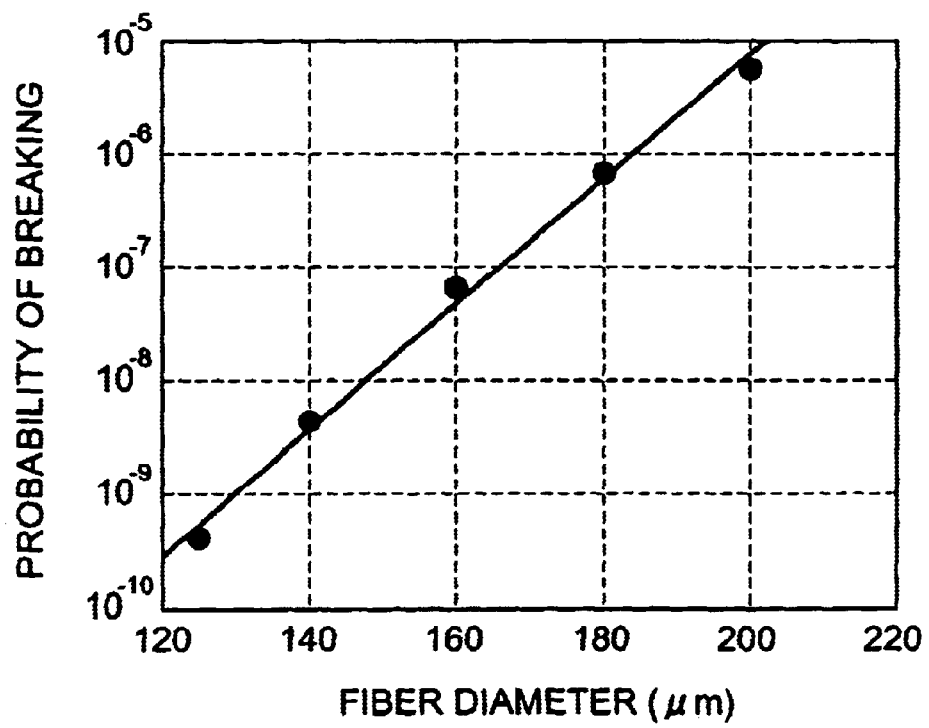
FIG. 11 is a graph showing a relationship between fiber diameter and probability of breaking.

FIG. 11 is a graph showing the relationship between the fiber diameter b and the probability of breaking according to above-mentioned expression (4) on the foregoing assumption. As can be seen from this graph, the probability of breaking becomes higher as the fiber diameter is greater. If the fiber diameter is 200 μm or less, however, then the probability of breaking is $10^{-5}$ or lower, whereby there is no problem in practice.

Fourth Embodiment

The fourth embodiment will now be explained. Prepared for the evaluation of the fourth embodiment were two kinds of samples 4a and 4b, each having a refractive index profile of a dispersion-shifted optical fiber with the outer ring core/depressed cladding structure shown in FIG. 3B, whose values of Petermann-I mode field diameter MFD1 were substantially identical to each other, whereas their values of fiber diameter b were different from each other.

Here, as mentioned above, the refractive index n1 of the inner core, the refractive index n2 of the intermediate core, the refractive index n3 of the outer ring core, the refractive index n4 of the inner cladding, and the refractive index n5 of the outer cladding have relationships of n1>n2, n3>n2, and n5>n4.

FIG. 12 is a table listing characteristics of each of the two kinds of samples prepared as prototypes for explaining the optical fiber according to the fourth embodiment. The fiber diameter b is about 125 μm in sample 4a, and about 150 μm in sample 4b. On the other hand, each of the Petermann-I mode field diameter MFD1 (11.98 and 12.17 μm) given by the above-mentioned expressions (1a) and (1b), effective area (69.7 and 72.1 μm²), chromatic dispersion value (−2.1 and −2.2 ps/nm/km), and cutoff wavelength (1.53 and 1.51 μm) is substantially the same value between the two kinds of samples 4a and 4b.

The two kinds of samples 4a and 4b having respective values of fiber diameter b different from each other as such were obtained by preparing two kinds of preforms, which used core members having an identical diameter, whose outside diameter ratios between core member and cladding member differed from each other, and drawing them. Further, the periphery of each of the two kinds of samples 4a and 4b is provided with the coating layer, made of the same material, having an outside diameter of 250 μm (see FIG. 4A). The values of the mode field diameter MFD1, effective area, and chromatic dispersion are those measured at a wavelength of 1.55 μm.

For each of these two kinds of samples 4a and 4b, microbend loss was measured by a method similar to that in the case of the first embodiment. As a result, while the microbend loss of sample 4a having a fiber diameter b of about 125 μ was 4.12 dB/km, the microbend loss of sample 4b having a fiber diameter b of about 150 μ was 0.74 dB/km, whereby the latter was able to achieve the target value of microbend loss of about 1 dB/km or less, by which no increase in loss would be generated by cabling.

Fifth Embodiment

Figure 13:
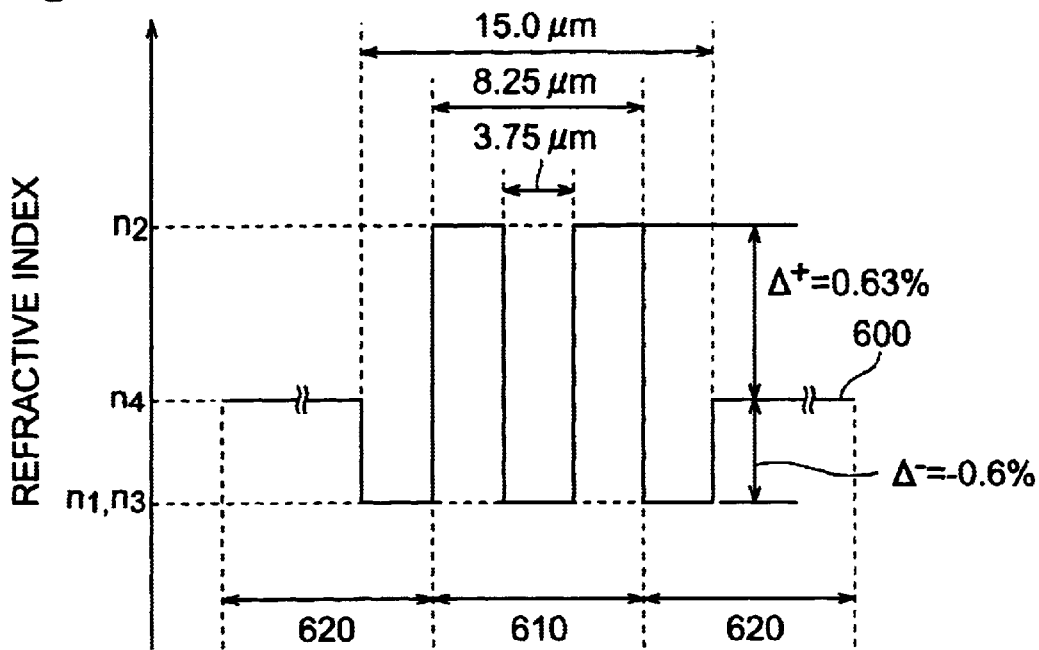
FIG. 13 is a chart showing a refractive index profile in the fifth embodiment of the optical fiber according to the present invention.

FIG. 13 is a chart showing the refractive index profile in the fifth embodiment of the optical fiber according to the present invention. The optical fiber according to the fifth embodiment is a dispersion-flattened fiber, in which the core region having an outside diameter a is constituted by an inner core having a refractive index n1 and an outside diameter of 3.75 μm, and an outside core provided on the outer periphery of the inner core and having a refractive index n2 (>n1) and an outside diameter of 8.25 μm. On the other hand, the cladding region having an outside diameter b has a depressed cladding structure and is constituted by an inner cladding which is provided on the outer periphery of the outer core and which has a refractive index n3 (=n1) and an outside diameter of 15.0 μm, and an outside cladding provided on the outer periphery of the inner cladding and having a refractive index n4 (>n3, <n2) and an outside diameter b.

The refractive index profile 600 shown in FIG. 13 indicates the refractive index of each part on the line L in FIG. 3A, in which parts 610 and 620 show respective refractive indices in the core region 110 and cladding region 120. Further, in the fifth embodiment, the relative refractive index difference $\Delta^+$ of the outer core (refractive index n2) with respect to the outer cladding (refractive index n4) is +0.63%, whereas the relative refractive index difference $\Delta^-$ of each of the inner core (refractive index n1) and the inner cladding (refractive index n3) with respect to the outer cladding (refractive index n4) is −0.60%, each given by the following expression (5):

$$\Delta = (n_{core}^2 - n_{cld}^2)/n_{cld}^2 \quad (5)$$

In the above-mentioned expression (5), $n_{core}$ is the refractive index of the subject glass region, $n_{cld}$ is the refractive index of the outer cladding taken as the reference. In expression (5), the refractive indices of the individual glass regions can be placed in any order, so that the relative refractive index difference of a region having a refractive index higher than that of the outer cladding becomes a positive value and is represented by Δ⁺, whereas the relative refractive index difference of a region having a refractive index lower than that of the outer cladding becomes a negative value and is represented by Δ⁻. In this specification, the relative refractive index difference is expressed in terms of percentage.

The samples prepared for evaluating the fifth embodiment consist of two kinds having fiber diameters of 125 μm and 160 μm, respectively. Also, the periphery of each of these samples is provided with the coating layer, made of the same material, having an outside diameter of 250 μm (see FIG. 4A). Though their fiber diameters are different from each other, both of the samples have a chromatic dispersion value of 0.12 ps/nm/km at 1.55 μm, an effective area of 72 μm² at a wavelength of 1.55 μm, and a cutoff wavelength of 1.187 μm. Also, their dispersion slope is 0.0096 ps/nm²/km at a wavelength of 1530 nm, 0.0120 ps/nm²/km at a wave length of 1550 nm, and 0.0265 ps/nm²/km at a wavelength of 1560 nm. Here, the dispersion slope refers to the gradient of the graph indicating the chromatic dispersion value in a predetermined wavelength band.

The microbend loss at a wavelength of 1.55 μm (1550 nm) was evaluated in each sample and, as a result, was found to be 1.1 dB/km in the sample with a fiber diameter of 125 μm and 0.1 dB/km in the sample with a fiber diameter of 160 μm, whereby it was verified that the increase in loss caused by cabling was fully suppressed in the latter.

Sixth Embodiment

Figure 14:
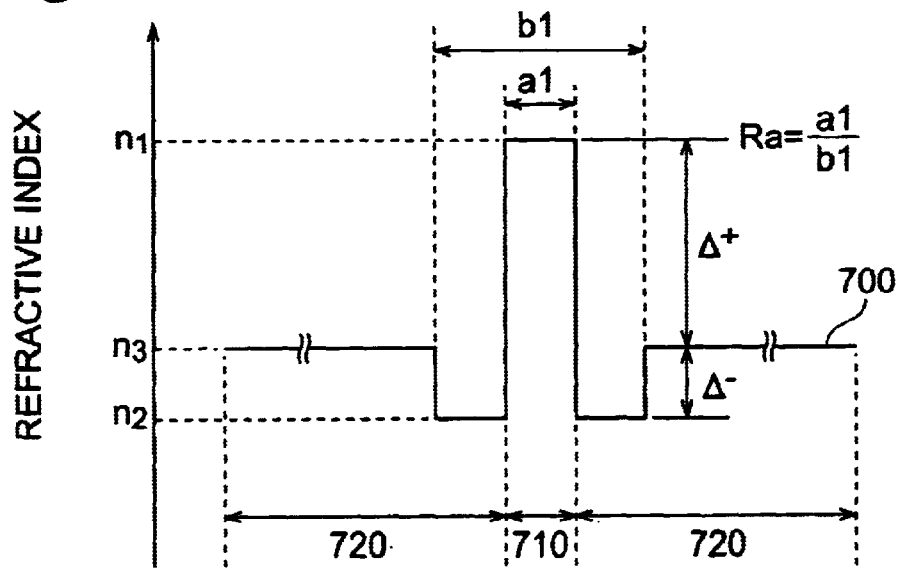
FIG. 14 is a chart showing a refractive index profile in the sixth and seventh embodiments of the optical fiber according to the present invention.

FIG. 14 is a chart showing the refractive index profile in the sixth embodiment of the optical fiber according to the present invention. The optical fiber according to the sixth embodiment is a dispersion-compensating fiber in which the core region having an outside diameter a is constituted by a single core having a refractive index n1 and an outside diameter a1. On the other hand, the cladding region having an outside diameter b has a depressed cladding structure and is constituted by an inner cladding which is provided on the outer periphery of the core and which has a refractive index n2 (<n1) and an outside diameter b1, and an outer cladding provided on the outer periphery of the inner cladding and having a refractive index n3 (>n2, <n1) and the outside diameter b.

The refractive index profile 700 shown in FIG. 14 indicates the refractive index of each part on the line L in FIG. 3A, in which parts 710 and 720 show respective refractive indices in the core region 110 and cladding region 120. Further, in the sixth embodiment, the relative refractive index difference Δ⁺ of the core (refractive index n1) with respect to the outer cladding (refractive index n3) and the relative refractive index difference Δ⁻ of the inner cladding (refractive index n2) with respect to the outer cladding (refractive index n3) are each given by the above-mentioned expression (5).

Figure 15:
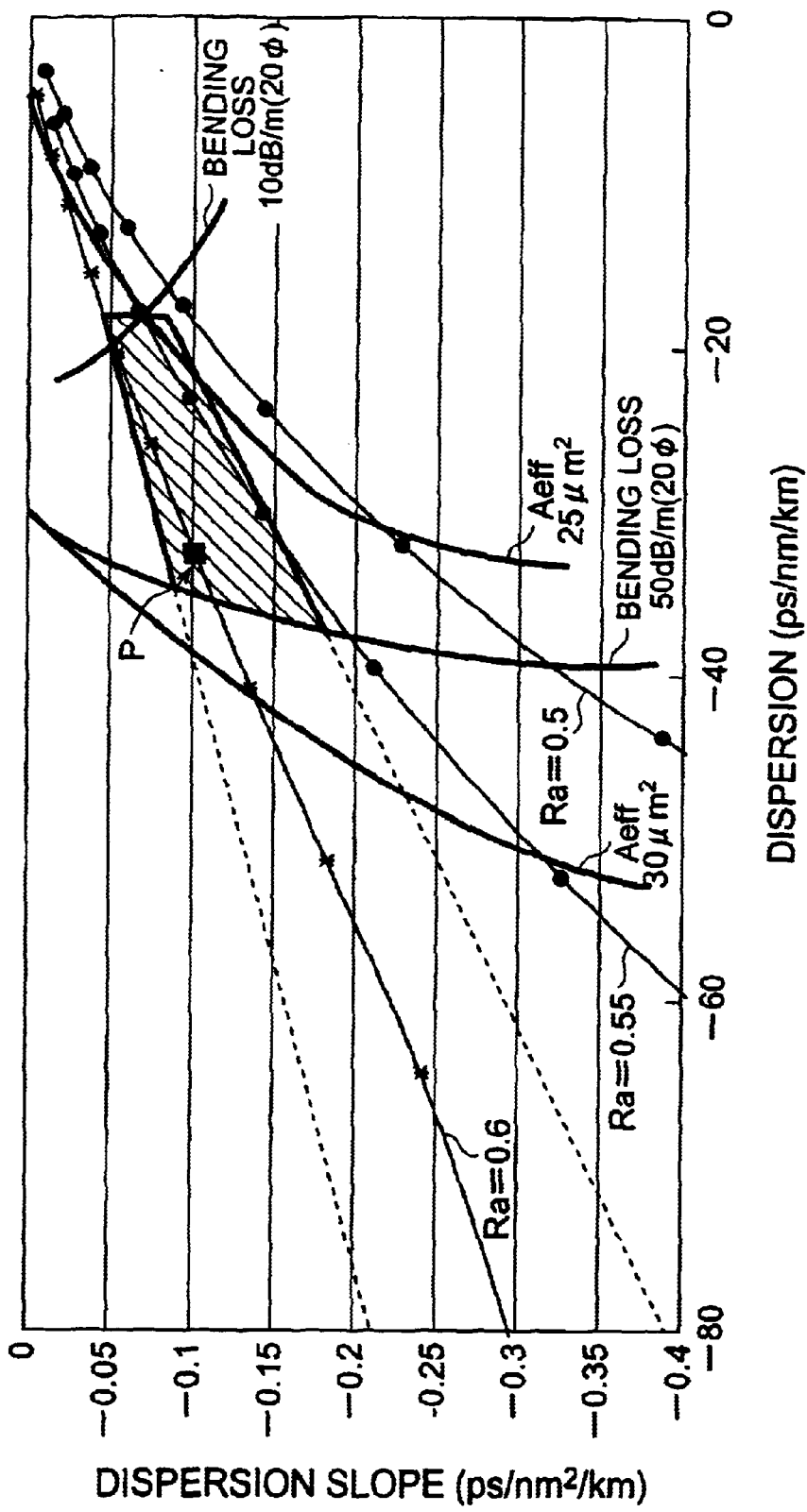
FIG. 15 is a graph showing the relationship between chromatic dispersion and dispersion slope in the optical fiber ($\Delta^+=0.9\%$, $\Delta^-=-0.44\%$) according to the sixth embodiment shown in FIG. 14.

The samples prepared for evaluating the sixth embodiment are those, among samples with Δ⁺=+0.9% and Δ⁻=−0.44% as shown in FIG. 15, having characteristics indicated by point P in FIG. 15 in which the chromatic dispersion value at 1.55 μm (1550 nm) is −33 ps/nm/km, the dispersion slope at 1.55 μm (1550 nm) is −0.10 ps/nm²/km, the effective area $A_{eff}$ is 28 μm², and the ratio Ra (=a1/b1) of the outside diameter a1 of the core region to the outside diameter b1 of the inner cladding is 0.6. They consist of two kinds having fiber diameters of 125 μm and 160 μm, respectively. Also, the periphery of each of these samples is provided with the coating layer, made of the same material, having an outside diameter of 250 μm (see FIG. 4A).

The microbend loss at a wavelength of 1.55 μm (1550 nm) was evaluated in each sample and, as a result, was found to be 2.3 dB/km in the sample with a fiber diameter of 125 μm and 0.3 dB/km in the sample with a fiber diameter of 160 μm, whereby it was verified that the increase in loss caused by cabling was fully suppressed in the latter.

Seventh Embodiment

Further, in the seventh embodiment, optical fibers having a further enlarged effective area were evaluated. While the prepared samples have a refractive index profile identical to that of FIG. 14, their effective area is 122 μm² (110 μm² or more). The prepared samples consist of two kinds having fiber diameters of 125 μm and 160 μm, respectively. Also, the periphery of each of these samples is provided with the coating layer, made of the same material, having an outside diameter of 250 μm (see FIG. 4A). In both of the samples, though their fiber diameters are different from each other, the relative refractive index difference Δ⁺ of the core (refractive index n1) with respect to the outer cladding (refractive index n3) is +0.28%, the relative refractive index difference Δ⁻ of the inner cladding (refractive index n2) with respect to the outer cladding (refractive index n3) is −0.14%, the cutoff wavelength is 1.49 μm, the effective area at a wavelength of 1.55 μm is 122 μm², the chromatic dispersion value at a wavelength of 1.55 μm is 22.1 ps/nm/km, and the dispersion slope at a wavelength of 1.55 μm is 0.062 ps/nm²/km.

The microbend loss at a wavelength of 1.55 μm (1550 nm) was evaluated in each sample and, as a result, was found to be 1.3 dB/km in the sample with a fiber diameter of 125 μm and 0.2 dB/km in the sample with a fiber diameter of 160 μm, whereby it was verified that the increase in loss caused by cabling was fully suppressed in the latter.

As explained in the foregoing, since the optical fiber according to the present invention has a fiber diameter of 140 μm or more but 200 μm or less, the increase in microbend loss is effectively suppressed, and the probability of breaking caused by bending stresses can be lowered to such an extent that it is practically unproblematic. Also, if the absolute value of chromatic dispersion at a wavelength of 1.55 μm is 5 ps/nm/km or less, and the Petermann-I mode field diameter is 11 μm or more, then the occurrence of nonlinear optical phenomena is suppressed, whereby the optical fiber can suitably be used as an optical transmission line in WDM transmission systems utilizing the wavelength band of 1.55 μm.

Without being restricted to the above-mentioned individual embodiments, the present invention can be modified in various manners. For example, the refractive index profile may have any structure without being limited to the double core structure and segmented core structure. It can also be realized by a ring core type refractive index profile in which a ring core region of a ring shape having a higher refractive index is provided around a center region having a lower refractive index.

In the present invention, as explained in the foregoing, since the fiber diameter is 140 μm or more, the optical fiber has a high rigidity, so that the increase in microbend loss is suppressed, whereas the probability of the optical fiber breaking due to bending stresses is practically unproblematic since the fiber diameter is 200 μm or less. Also, if the absolute value of chromatic dispersion at a wavelength of 1.55 μm is 5 ps/nm/km or less, then the optical fiber is suitable for WDM transmissions in which this wavelength band is a wavelength in use. Further, in accordance with the present invention, since the mode field diameter is 11 µm or more, the optical energy density per unit cross-sectional area is so low that the occurrence of nonlinear optical phenomena can be suppressed effectively. Therefore, the optical fiber according to the present invention is suitable as an optical transmission line in WDM optical transmission systems.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber comprising a core region extending along a predetermined axis and a cladding region provided on the outer periphery of said core region, said core and cladding regions being constituted by at least three layers of glass regions having respective refractive indices different from each other;

said optical fiber substantially insured its single mode with respect to light at a wavelength in use;

said optical fiber having, for at least one wavelength in the wavelength band in use, a chromatic dispersion of −83 ps/nm/km or more; and said optical fiber having a fiber diameter of 140 µm or more but 200 µm or less.

2. An optical fiber according to claim 1, further comprising a coating layer having a diameter of 260 µm or less.

3. An optical fiber according to claim 2, wherein said coating layer comprises a first layer provided on the outer periphery of said cladding region, and a second layer provided on the outer periphery of said first layer.

4. An optical fiber according to claim 3, wherein said second layer has Young's modulus of 1000 times greater than that of said first layer.

5. An optical fiber according to claim 3, wherein said first layer has Young's modulus of 0.01 to 0.2 kgf/mm$^2$ at a temperature of 20° C., and said second layer has Young's modulus of 10 to 200 kgf/mm$^2$ at the temperature of 20° C.

6. An optical fiber according to claim 2, wherein said coating layer consists of a single layer.

7. An optical fiber according to claim 6, wherein said single layer has Young's modulus of 1 to 200 kgf/mm$^2$ at a temperature of 20° C.

8. An optical cable including an optical fiber according to claim 1.

9. An optical fiber comprising a core region extending along a predetermined axis and a cladding region provided on the outer periphery of said core region, said core and cladding regions being constituted by at least three layers of glass regions having respective refractive indices different from each other;

said optical fiber substantially insured its single mode with respect to light at a wavelength in use;

said optical fiber having a fiber diameter of 140 µm or more but 200 µm or less; and said optical fiber having a coating layer with a thickness of 55 µm or less.

10. An optical fiber according to claim 9, wherein the thickness of said coating layer is 25 µm or more.

11. An optical fiber according to claim 9, wherein said coating layer comprises a first layer provided on the outer periphery of said cladding region, and a second layer provided on the outer periphery of said first layer.

12. An optical fiber according to claim 11, wherein said second layer has Young's modulus of 1000 times greater than that of said first layer.

13. An optical fiber according to claim 11, wherein said first layer has Young's modulus of 0.01 to 0.2 kgf/mm$^2$ at a temperature of 20° C., and said second layer has Young's modulus of 10 to 200 kgf/mm$^2$ at the temperature of 20° C.

14. An optical fiber according to claim 9, wherein said coating layer consists of a single layer.

15. An optical fiber according to claim 14, wherein said single layer has Young's modulus of 1 to 200 kgf/mm$^2$ at a temperature of 20° C.

16. An optical cable including an optical fiber according to claim 9.

* * * * *